United States Patent Office 2,826,537
Patented Mar. 11, 1958

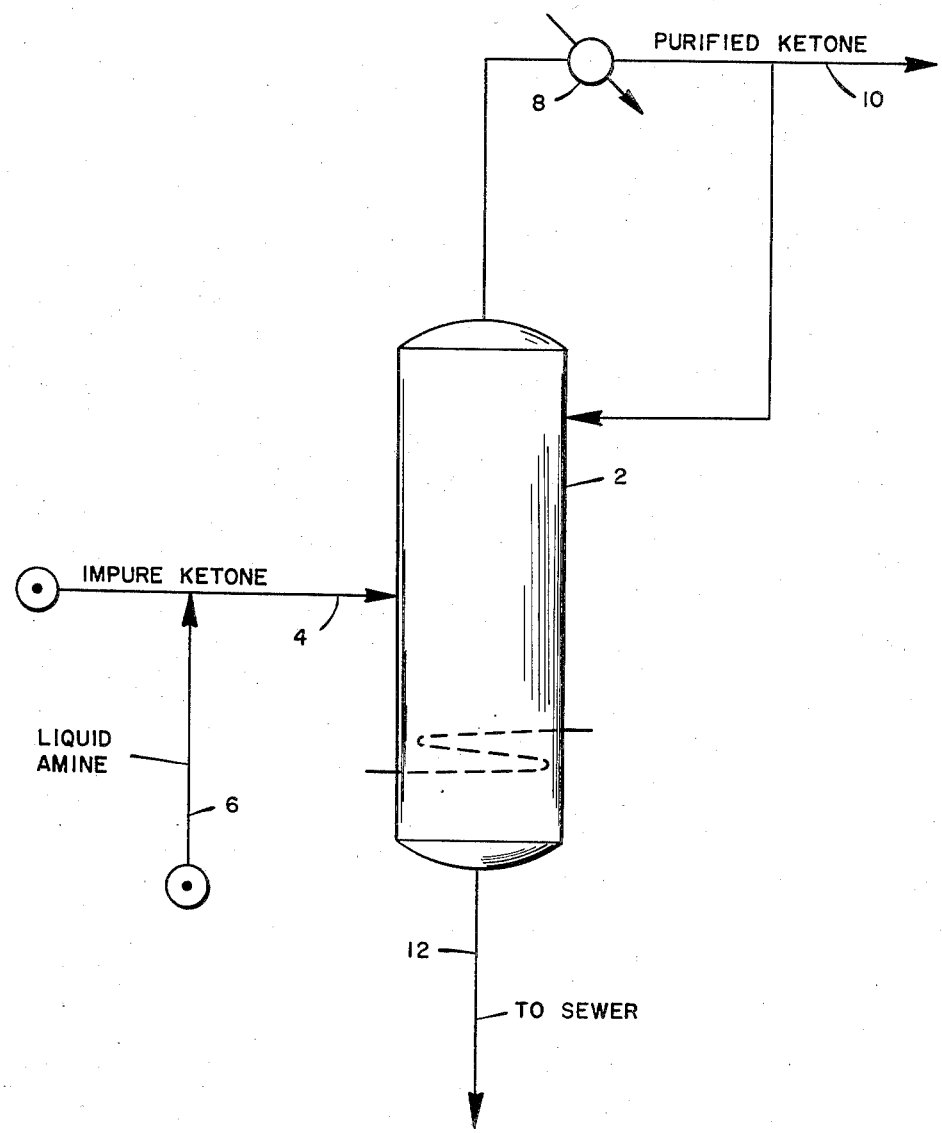

2,826,537

METHOD FOR PURIFICATION OF KETONES

Shelby P. Sharp and Alfred Steitz, Jr., Tulsa, Okla., assignors to Pan American Petroleum Corporation, a corporation of Delaware Application August 27, 1953, Serial No. 376,964

14 Claims. (Cl. 202—57)

The present invention relates to a novel method for the purification of ketones. More particularly it is concerned with a process for removing aldehyde and other objectionable impurities present in ketone streams originating from a wide variety of sources.

The stability of ketones on storage is poor, as is evident from their tendency to go off specification in color, acidity and odor. Because of the tendency of methyl ketones to deteriorate rapidly with respect to the aforesaid characteristics, it has been the common practice of those engaged in the commercial production of such compounds to restrict their storage life to a period not in excess of about sixty days. These poor storage characteristics are inherent in methyl ketones and are accentuated by the presence of various impurities in concentrations as high as from about 1 to about 3 volume percent. The stability of such ketones has been found to be especially poor if they are exposed to light for a period of time. In the past, attempts have been made to remove these impurities by digestion of the crude ketone with caustic. This procedure did not prove very satisfactory, however, principally because the caustic was relatively ineffective in reducing the concentration of undesirable contaminants to a concentration sufficiently low not to cause subsequent difficulties with regard to the color, odor and acidity of the ketones.

Accordingly, it is an object of our invention to provide a novel and efficient method for removing objectionable contaminants from ketones involving treating the latter with a non-volatile amine or a suitable salt thereof. It is a further object to provide a method for the purification of ketones whereby the storage stability characteristics of the latter greatly exceed such characteristics of ketones purified by previously-known procedures.

In carrying out the process of our invention, the crude ketone is subjected to distillation in the presence of a suitable non-volatile amine. By the presence of the latter the impurities, which include aldehydes and colored substances of unknown structure, are converted to high-boiling derivatives and are removed as bottoms. Product ketone having long storage life and capable of passing conventional specifications as to color, acidity and odor is collected as distillate.

The period of time which the amine compound is allowed to contact the impure ketone stream and the concentration of amine employed may vary rather widely. However, at amine concentrations ranging from about 0.1 to about 3 weight percent such contact time between the amine and ketone to be purified should be at least about three hours. For most batches of ketone, the time required to bring the mixture to distillation temperature plus distillation time necessary for removal of the ketone overhead will be found adequate to achieve the desired results at the amine concentrations recommended above.

The amines employed in carrying out the process of our invention may be selected from a wide variety of compounds, the principal requirement being that the amine used possess a higher boiling point than the ketone to be purified. Such compounds include amines represented by the general structural formula

wherein the substituents R and $R_1$ combined complete a morpholine ring, R represents alkyl, beta hydroxyethyl or hydrogen and $R_1$ may be beta hydroxyethyl or alkyl. However, where either R or $R_1$, or both of these substituents represent an alkyl group, the sum of the carbon atoms present in the alkyl group or groups should be in excess of 3—for example, from 4 to 8 carbon atoms. In addition to the various amines coming within the scope of the above generic formula, there may be mentioned ethylenediamine, diethylenetriamine, triethylenetetramine, tetraethylenepentamine, propylenediamine, ammoethylethanolamine, monoisopropanolamine, phenylethanolamine and phenyldiethanolamine. Also, various of the well-known polyamine ion exchange resins may be employed as reagents in the process of our invention for purification of ketones of the type herein contemplated. In this connection, the term "non-volatile amine" appearing in certain of the appended claims is intended to include the foregoing amines and is limited to resins of the aforesaid type or to liquid amines having a higher boiling point than the ketone to be purified. Also, with respect to the amines found to be operative in carrying out our invention, we wish to point out that the corresponding carboxylic acid salts of the foregoing amines function equally well. Thus the acetate, propionate, butyrate and similar salts of the aforesaid amines may be employed for the purpose of purifying ketone streams as set forth herein. Also, good results have been obtained by the use of amine salts in the presence of free carboxylic acid. Inasmuch as we have found amines of the above-mentioned type and their corresponding carboxylic acid salts to function as equivalents in the process of our invention, the term "amine" as used in the present description and claims is intended to cover both the free amine compound, the aforesaid salts thereof and said salts in the presence of free carboxylic acid.

In this connection, it is to be specifically understood that while it may be presumed the amine compounds utilized in purifying ketones in accordance with our invention undergo reaction with aldehyde impurities present in the ketone being treated, we have found that such is apparently not the case. In fact, it has been our observation that in order to remove aldehydes and other contaminants from ketones of the type contemplated it is unnecessary to add the amine compound in the quantity stoichiometrically required. In other words, the amine presumably behaves as a catalyst for the conversion of the aforesaid objectionable impurities into higher boiling derivatives which may be removed as bottoms from the mixture of crude ketone being distilled.

Our invention may be employed in the form of a batch or as a continuous process. However, in the event it is desired to carry out the process in continuous fashion, we have found it preferable to recycle a relatively small portion—for example, from about 15 to 30 percent—of the still tower bottoms to the feed in order to provide adequate contact of the amine with the ketone and accompanying impurities. In this manner ketones may be freed of objectionable impurities by means of continuous distillation methods to the same extent as is possible by the use of batch distillation procedures.

While our invention is applicable to the purification of ketones contaminated with substances that tend to cause such ketones on storage to deteriorate with respect to odor, color and acidity, we have found it particularly useful in purifying the various methyl ketones such as methyl ethyl ketone, methyl propyl ketone, methyl n-amyl ketone and the like. Such impurities may be present in a total concentration, for example, of about 1 percent and still permit a highly purified ketone to be obtained which may be stored for extended periods of time under conventional conditions without adverse effects.

For a better understanding of our invention, reference is made to the accompanying drawing in which an impure ketone contaminated with an objectionable concentration of aldehyde is introduced into column 2 through line 4 along with from about 0.1 to about 3.0 weight percent of a suitable liquid amine added through line 6. Fractionating column 2 is operated at a top tower temperature corresponding to the approximate boiling point of the pure ketone. Under these conditions, a ketone stream is taken overhead via condenser 8 and withdrawn from the system through line 10. A portion of the overhead product in line 10 is returned to column 2 as reflux. High boiling materials which are primarily aldehyde condensation products are withdrawn from the column through line 12 and discarded.

the above-mentioned distillation operation was exposed to the same storage conditions and the characteristics of this sample are also listed. While the current specifications for methyl ethyl ketone do not require any particular permanganate time, this property is a convenient indication of oxidizable impurities present which might adversely affect color, acidity and odor of the stored samples. For this reason, permanganate times of the samples investigated are included. The following are standard sales specifications for methyl ethyl ketone:

Color—maximum 10 APHA [1]
Acidity—maximum 0.003 weight percent as acetic acid
Odor—characteristic

[1] Color standard of American Public Health Association.

Samples A and B, referred to in the table below, were obtained from two different manufacturers producing methyl ethyl ketone in commercial quantities. These samples were not treated with amine in accordance with the present invention, but serve as a comparison to demonstrate the improved storage characteristics of ketones purified by the process of said invention.

*Table I*

| Treating Agent | Permanganate Time, Minutes | Aldehyde, Wt. Percent as Butyraldehyde | Color, APHA | Acidity, Wt. Percent as Acetic | Odor |
|---|---|---|---|---|---|
| Untreated Sample | 9 | 0.10 | 15 | 0.035 | |
| Morpholine: | | | | | |
| Fresh Distillate | 540 | 0 | 10 | 0.003 | |
| 30 Days' Storage | 605 | 0 | 10 | | |
| 60 Days' Storage | 665 | 0 | 10 | | |
| 90 Days' Storage | 400 | 0 | 10 | 0.003 | Characteristic. |
| Monoethanolamine: | | | | | |
| Fresh Distillate | 106 | 0.004 | 10 | 0.003 | |
| 30 Days' Storage | 130 | 0.017 | 10 | | |
| 60 Days' Storage | 130 | 0.015 | 10 | | |
| 90 Days' Storage | 125 | 0.012 | 10 | 0.003 | Do. |
| Diethanolamine: | | | | | |
| Fresh Distillate | 107 | 0.007 | 10 | 0.003 | |
| 30 Days' Storage | 95 | 0.020 | 10 | | |
| 60 Days' Storage | 90 | 0.017 | 10 | | |
| 90 Days' Storage | 67 | 0.015 | 10 | 0.003 | Do. |
| Sample A: | | | | | |
| Initial Test Without Distillate | 1 | 0.010 | 30 | 0.005 | Slight acetic residue. |
| 20 Days' Storage | <1 | | | | |
| 60 Days' Storage | <1 | 0.013 | 30 | | |
| 150 Days' Storage | <1 | 0.014 | 25 | 0.008 | Residual. |
| Sample B: | | | | | |
| Initial Test Without Distillate | 3 | 0 | 20 | 0.004 | Characteristic. |
| 7 Days' Storage | 2 | | 20 | 0.004 | |
| 14 Days' Storage | | 0 | | | |
| 42 Days' Storage | 2 | 0 | 25 | 0.004 | |
| 150 Days' Storage | 2 | 0.007 | 30 | 0.006 | Residual. |

The process of our invention will be further illustrated by the following specific examples:

EXAMPLE 1

1000 ml. of methyl ethyl ketone was heated at atmospheric pressure under total reflux in the presence of 0.25 volume percent of the various amines indicated below for a period of one hour. Thereafter the ketone was fractionally distilled at a reflux ratio of 10:1 and a total of 950 ml. was taken overhead as distillate. Aliquots of the resulting distillate were then stored in open, brown, soft-glass bottles for the periods indicated. An untreated sample from the same batch of ketone used as feed in

EXAMPLE 2

The following example illustrates the superiority of the amines contemplated by our invention over caustic treatment to remove aldehydes and other impurities from the ketone being treated. The two ketones tested were methyl ethyl ketone and methyl propyl ketone, and both were treated by taking separate 100 ml. samples and carefully fractionating them at a 40 to 1 reflux ratio in the presence of the amine or caustic in the concentrations listed below. The time required in the case of each distillation was approximately twelve hours.

*Table II*

| Ketone Treated | Treating Agent, Wt. Percent | | Weight of Fraction Tested, Gms. | Percent Aldehyde Present After Treatment |
|---|---|---|---|---|
| Methyl propyl ketone | | | | [1] 9.7 |
| Do | NaOH | 1.0 | 65.5 | 6.5 |
| Do | Morpholine | 1 ml. (1.24 wt. percent). | 48.8 | 0.63 |
| Methyl ethyl ketone | | | 47.8 | [1] 0.40 |
| Do | NaOH | 0.19 wt. percent | 77.5 | 0.29 |
| Do | Monoethanolamine | 0.2 ml. (0.25 wt. percent). | 94 | 0.05 |

[1] Control experiment—no chemical treatment.

The above example, as well as certain of the others appearing herein, demonstrates the catalytic effect of the amine treating agent on the removal of aldehyde.

EXAMPLE 3

A 200 ml. sample of a crude mixture of methyl ethyl ketone and methyl propyl ketone containing 3.2 percent valeric acid and 9.7 weight percent valeraldehyde was washed with 60 ml. of 10 weight percent caustic solution to remove free acid. One-hundred ml. portions of the resulting acid-free mixture were thereafter subjected to careful fractionation at a reflux ratio of 40 to 1 under the conditions indicated in the table below. A similar fractionation was performed on the initial crude mixture without caustic wash or amine treatment, as a control experiment.

*Table III*

| Ketone | Treating Agent, Wt. Percent | Wt. of Distillate Tested, Gms.[1] | Aldehyde Content, Wt. Percent |
|---|---|---|---|
| Methyl propyl ketone | Control | 56.7 | 8.3 |
| Do | Monoethanolamine—1.0 | 56.8 | 1.8 |
| Do [2] | do | 50.8 | 0.42 |

[1] Represents amount distilled over between 98° and 102.5° C. (B. P. methyl propyl ketone 102.3° C.).
[2] This ketone sample did not have a caustic wash.

From the foregoing it will be seen that while both the free amine and the amine in the presence of an excess of acid over the stoichiometrically required amount substantially reduced the aldehyde content of the methyl propyl ketone, the amine salt in the presence of free acid was particularly effective in accomplishing this result. The efficiency of the amine salt in the absence of free acid has been observed to be comparable to that of the free amine.

The operability of polyamine ion exchange resins in the process of our invention is illustrated by the following example.

EXAMPLE 4

A glass tube 4 feet in length and ½ inch in diameter was charged with Rohm and Haas "Amberlite IR-4B"[1] amine-type ion exchange resin. This particular resin is a weak-base type supplied in basic form an has a capacity of about 3 milliequivalents (acid) per milliliter. This resin was rinsed with pure dry methyl ethyl ketone before charging to the aforementioned tube. The resin washed in this manner possessed a relatively low moisture content. The tube was surrounded by a jacket through which water was circulated at about 60° C. The methyl ethyl ketone was added to the top of the tube and allowed to percolate through the bed of resin. The rate of flow was controlled by means of a stopcock located at the base of the tube. The crude methyl ethyl ketone to be purified, in accordance with the conditions of the present example, contained 0.1 weight percent aldehyde as butyraldehyde. The ketone thus treated was thereafter carefully fractionated. The results obtained are indicated below.

[1] Polyalkylene polyamine condensation product of phenol, formaldehyde and an amine such as, for example, methyl amine.

*Table IV*

| Run No. | Rate of MEK Addition, cc. per minute | Cut No. | Aldehyde Content—Weight Percent Butyraldehyde |
|---|---|---|---|
| 1 | 20 | 5 | 0.033 |
|   |    | 10 | 0.044 |
|   |    | 15 | 0.017 |
|   |    | 20 | 0.028 |
| 2 | 0.2 | 5 | 0 |
|   |    | 10 | 0 |
|   |    | 15 | 0 |
|   |    | 20 | 0 |

The above examples constitute specific embodiments of our invention adapted to the purification of specific ketones. It is to be strictly understood, however, that our invention is not to be construed as limited thereto but, on the contrary, includes the broad idea of purifying ketones of the type herein disclosed by treatment with a relatively non-volatile amine of the class described. In general, it may be said that any modifications or equivalents thereof which would ordinarily occur to one skilled in the art are to be considered as lying within the scope of our invention.

We claim:

1. In a process for the purification of a normally liquid ketone contaminated with an aldehyde and colored impurities of unknown structure, the steps which comprise adding to said ketone, in an amount less than that stoichiometrically required to react with said aldehyde and colored impurities, a non-volatile liquid amine, said amine functioning as a catalyst for the conversion of said aldehyde and colored impurities of unknown structure into higher boiling derivatives, subjecting the resulting mixture to fractional distillation and collecting a distillate of a stable ketone having a substantially reduced aldehyde content.

2. In a process for the purification of a normally liquid methyl ketone contaminated with an aldehyde, the steps which comprise adding to said ketone an amount corresponding to from about .025 to about .12 weight percent, based on the weight of said aldehyde, of a non-volatile amine having the following general structural formula:

wherein the substituents R and $R_1$ combined complete a morpholine ring, R represents a member selected from the group consisting of alkyl, beta hydroxyethyl and hydrogen and $R_1$ represents a member of the group consisting of alkyl and beta hydroxyethyl, in which the sum of the carbon atoms present in all of said alkyl groups ranges from 4 to 8, said amine functioning as a catalyst for the conversion of said aldehyde into higher boiling derivatives, subjecting the resulting mixture to fractional distillation and collecting a stable ketone distillate of substantially reduced aldehyde content and having improved storage characteristics.

3. In a process for the purification of a normally liquid methyl ketone contaminated with an aldehyde and colored impurities of unknown structure, the steps which comprise adding to said ketone an amount corresponding to from about .025 to about .12 weight percent, based on the weight of said aldehyde, of an amine carboxylic acid salt, said salt functioning as a catalyst for the conversion of said aldehyde and colored impurities of unknown structure into higher boiling derivatives, subjecting the resulting mixture to fractional distillation in the presence of an uncombined carboxylic acid and collecting a stable ketone distillate of substantially reduced aldehyde content and having improved storage characteristics.

4. The process of claim 2 in which the ketone is methyl ethyl ketone.

5. The process of claim 2 in which the ketone is methyl propyl ketone.

6. The process of claim 2 in which the amine employed is monoethanolamine.

7. The process of claim 2 in which the amine employed is diethanolamine.

8. The process of claim 2 in which the amine employed is morpholine.

9. The process of claim 2 in which a carboxylic acid salt of monoethanolamine is employed as the amine and the ketone is methyl propyl ketone.

10. The process of claim 2 in which the amine is monoethanolamine and the ketone is methyl ethyl ketone.

11. The process of claim 2 in which the amine is morpholine and the ketone is methyl propyl ketone.

12. The process of claim 2 in which the amine is diethanolamine and the ketone is methyl ethyl ketone.

13. The process of claim 6 wherein the ketone is purified in the presence of uncombined carboxylic acid.

14. The process of claim 6 wherein the ketone is purified in the presence of valeric acid.

References Cited in the file of this patent
UNITED STATES PATENTS

| | | |
|---|---|---|
| 1,987,601 | Burk | Jan. 15, 1935 |
| 2,126,611 | Britton | Aug. 9, 1938 |
| 2,204,956 | Bresler | June 18, 1940 |
| 2,384,375 | Harrison | Sept. 4, 1945 |
| 2,429,484 | Peters | Oct. 21, 1947 |
| 2,575,244 | Carlson et al. | Nov. 13, 1951 |
| 2,614,072 | Carlson et al. | Oct. 14, 1952 |
| 2,631,970 | Barnes | Mar. 17, 1953 |
| 2,635,074 | Steitz | Apr. 14, 1953 |